Nov. 14, 1967  R. H. WITT  3,352,539
CABLE JACK
Filed Feb. 1, 1966  3 Sheets-Sheet 1

INVENTOR
RAY H. WITT
BY
ATTORNEYS

Nov. 14, 1967  R. H. WITT  3,352,539
CABLE JACK

Filed Feb. 1, 1966

INVENTOR
RAY H. WITT

BY Cullen, Sloman & Cantor

ATTORNEYS

United States Patent Office 3,352,539
Patented Nov. 14, 1967

3,352,539
CABLE JACK
Ray H. Witt, Bloomfield Township, Mich.
(28240 Grand River, Farmington, Mich. 48024)
Filed Feb. 1, 1966, Ser. No. 524,259
4 Claims. (Cl. 254—71)

ABSTRACT OF THE DISCLOSURE

A jack-type of holddown device for applying tension to securing cables comprises a notched rack in which slides a guide body to which the free end of the securing cable is attached. An operating lever controls the sequence and action of two pawls which alternately engage the rack notches during the jacking operation to supply the tension reaction force.

Background of invention

This invention relates generally to holddown device, and more particularly to a jack type of force exerting device.

In the shipment of freight by rail or truck, it is frequently necessary to lash the cargo to a support to prevent shifting and resultant damage. Where the cargo comprises automotive vehicles, such as automobiles, it is desirable that means be available for applying considerable tension to the securing cables or chains, that the tension be easily adjustable and quickly releasable. Accordingly, it is the object of this invention to provide an improved holddown device which is capable of withstanding extremely high loads, permitting readily adjustable tension, and further capable of very rapid relief of the tension force.

Summary of invention

A jack-type of holddown device for applying tension to securing cables comprises a channel-shaped notched rack in which slides a guide body having a first pawl and an operating lever mounted on a first pivot axis, with a second pawl mounted on a second pivot axis on the operating lever. The jack is released by engagement of an operating lever-mounted cam, with a release boss on the first pawl, thus camming the first pawl out of engagement with the rack, and the first pawl in turn similarly camming the second pawl out of such engagement.

Brief description of the drawings

Referring to FIG. 1 in particular, the holddown jack assembly 10 of this invention generally comprises a guide body 12 which is slidably mounted in a C-shaped rack 14 provided with a plurality of notches 16 along the upper edge of both legs. Rack 14 is rigidly secured to a base support member such as the floor of a railroad car (not illustrated). The structure to be secured (i.e. an automobile) to the base support member is lashed by means of a chain or cable to clevis 18 which is pivotally mounted on clevis pin 20 secured to guide body 12 to the right (as viewed in FIGS. 1 and 2) will then exert a downward and lateral force to the secured structure.

Figure 6:
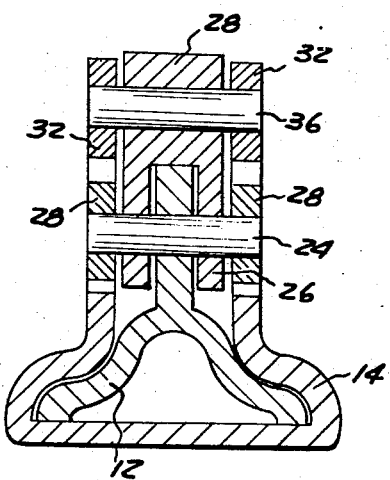
FIG. 6 is a sectional view taken in the direction of arrows 6—6 of FIG. 2.

The actuating mechanism of jack 10 comprises an L-shaped bifurcated actuating lever 22 which is pivotally secured to guide body 12 by means of lever pivot pin 24. Pin 24 passes through the legs 26 of lever 22, which straddle the guide body 12 (see FIG. 6).

Also pivotally mounted upon pin 24 are identical small pawls 28 which are provided with tongue portions 30. A pair of large pawls 32, each provided with a tongue portion 34, are pivotally mounted upon pivot pin 36 secured to legs 26 of lever 22.

Figure 1:
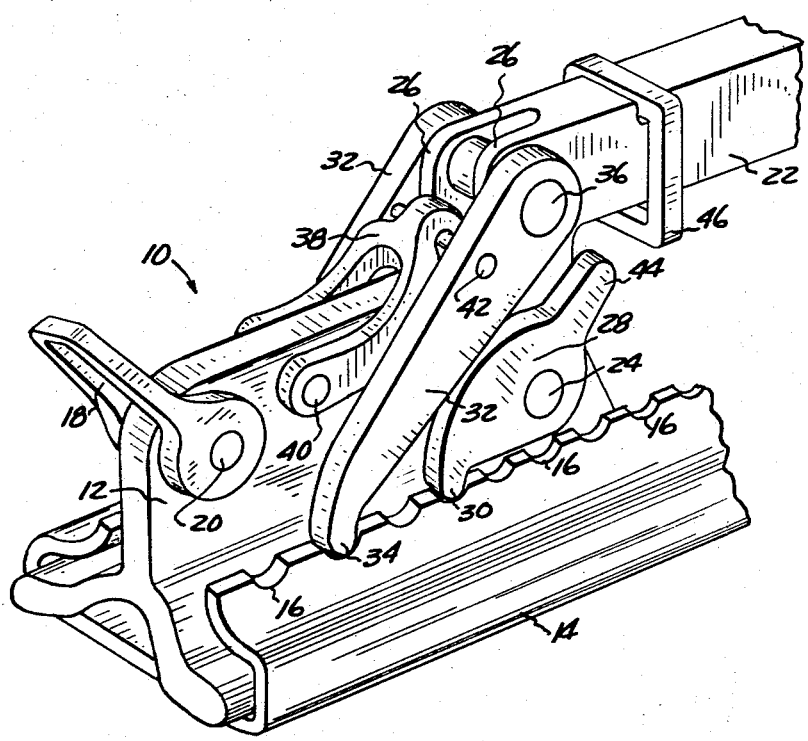
FIG. 1 is a perspective view of the holddown jack of this invention, illustrated in the normal tension-applying position.

A bifurcated hook 38, pivotally mounted upon guide body 12 by pivot pin 40, engages a pin 42 bridging the gap between the two large pawls 32. Hook 38 prevents clockwise rotation about pivot 24 of actuating lever 22 from the position shown in FIG. 1 or FIG. 2.

Small pawls 28 are each provided with a release boss 44 on their right hand portion. A pawl release cam 46 in the shape of a square loop rides an actuating lever 22 and is normally retained in groove 48 in the upper face of the lever.

Operation

Figure 2:
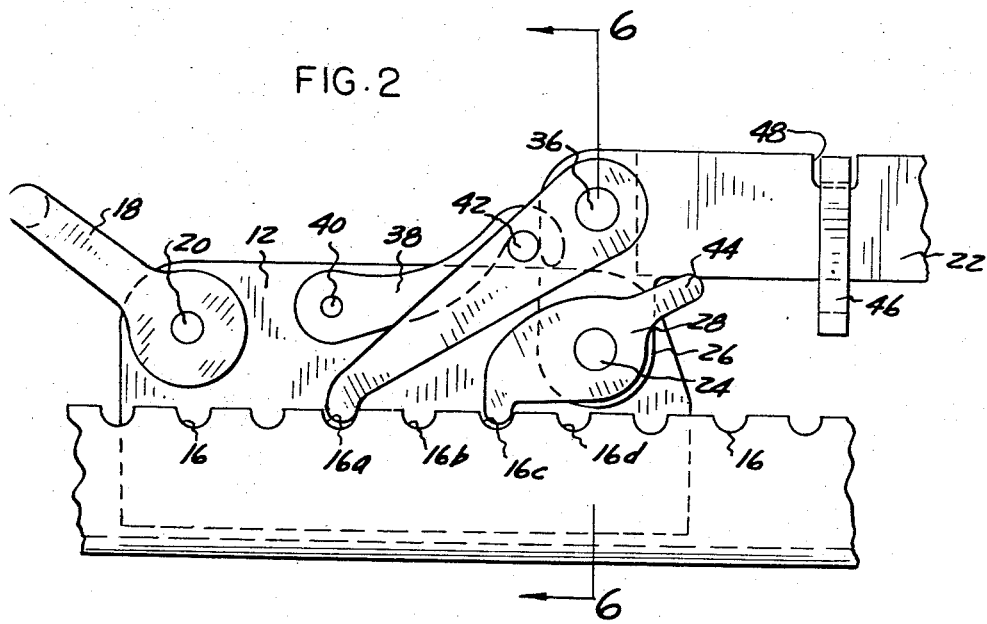
FIG. 2 is a side elevational view of the holddown jack, illustrated in the normal tension-applying position.

In the position shown in FIG. 2, the jack is capable of applying a tensile force to a cable attached to clevis 18. The horizontal component of this force is resisted by tongues 30 and 34 of pawls 28 and 32, respectively. The vertical component is opposed by the downward force of the legs of C-shaped rack 14 against the legs of guide body 12.

To increase the applied force, the guide body 12 is moved to the right, as viewed in FIGS. 2–4, in the following manner:

Actuating lever 22 is lifted upwardly, that is, rotated counterclockwise about pivot pin 24. However, due to the geometry of the assembly, lever 22 may not so rotate about pin 24. To do so would require pin 36 to move to the left, but pin 36 can move leftward only by rotating upward and to the left about tongue 34 restrained in notch 16a of rack 14. Such upward motion of pin 36 is impossible because body 12 is restrained against upward motion by the configuration of the rack, which permits only sliding motion of body 12 to the right or left.

Therefore pin 36 remains substantially stationary, while pivot pin 24 moves to the right carrying along with it small pawl 28 and guide body 12. This sequence is illustrated by comparison of FIG. 2 with FIG. 3. Tongue 30 is lifted out of notch 16c, and with continued upward counter-clockwise movement of lever 22, it drops into notch 16d of rack 14.

Once tongue 30 is secure in notch 16d, downward or clockwise movement of actuating lever 22 will then pivot the lever about pin 24. This motion moves pin 36 to the right, lifting tongue 34 of large pawl 32 out of notch 16a. Continued rotation of lever 22 drags tongue 34 along the top edge of rack 14 until it drops into adjacent notch 16b. This sequence is illustrated by comparison of FIG. 3 with FIG. 4. Once tongue 34 has dropped into notch 16b, the configuration of the jack assembly will be the same as is shown in FIG. 2, but with the whole device shifted one notch to the right. Each subsequent repetition of this two-stroke cycle of actuating lever 22 will similarly index guide body 12 one notch to the right.

Figure 3:
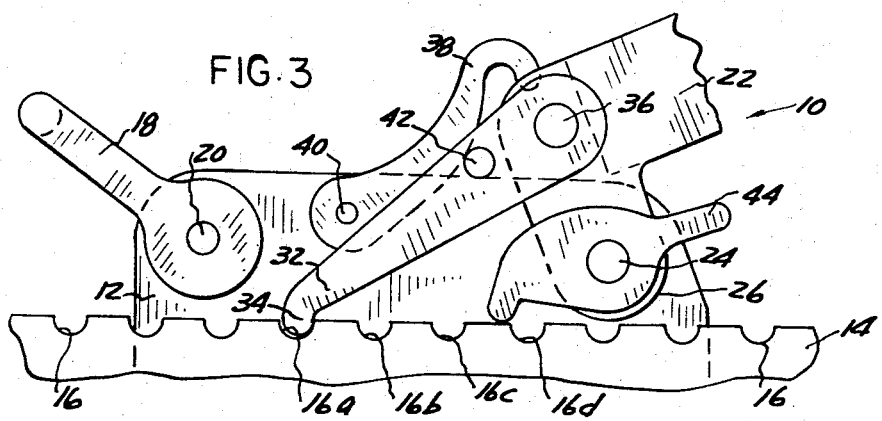
FIGS. 3 and 4 are side elevational views similar to FIG. 2, but illustrating successive steps of the tension-increasing action of the jack.
Figure 4:
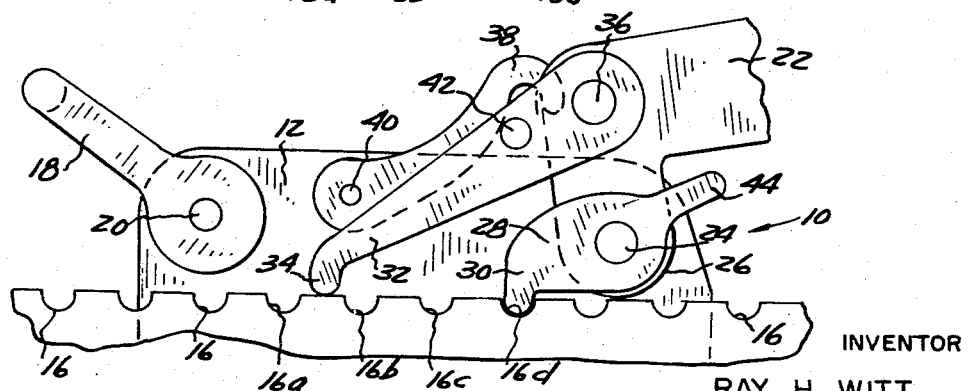
Figure 5:
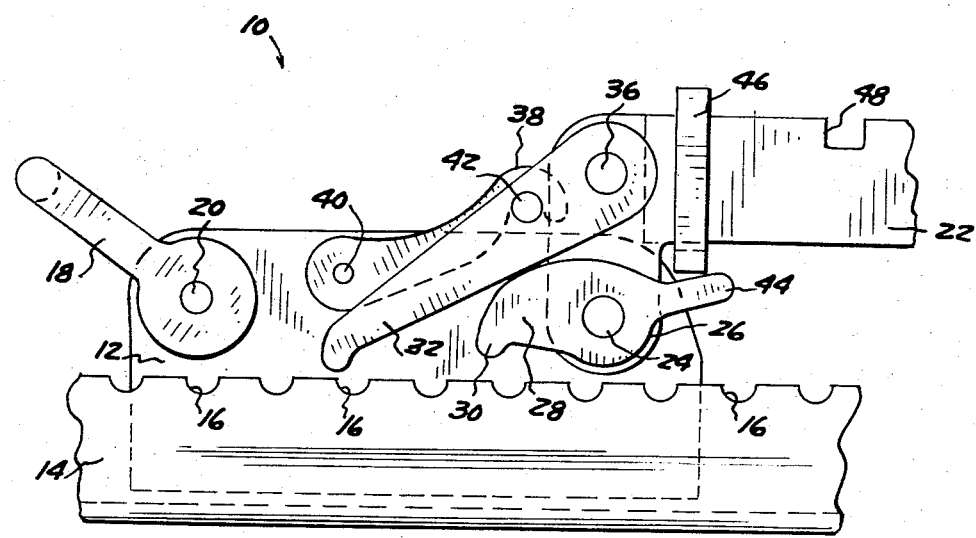
FIG. 5 is a side elevational view similar to FIG. 2, but illustrating the jack in the released position.

To release the jack, that is to permit the guide body to move leftward so as to release or reduce the tension on the structure being held down, the actuating lever 22 is lifted to the position shown in FIG. 3. The pawl release cam 46 (see FIG. 2) is then lifted out of groove 48. and permitted to slide to the left down the inclined lever 22 until the pawl release cam abuts the right hand edge of leg 26 or guide body 12 (see FIG. 5). When actuating lever 22 is subsequently lowered, the lower edge of cam 46 abuts release boss 44 on small pawl 28. This action then pivots small pawl 28 clockwise about pin 24, thus lifting tongue 30 out of groove 16. Continued rotation of small pawl 28 causes the upper face of the pawl to contact the lower face of large pawl 32, thus lifting the large pawl out of engagement with the rack. The jack then is in the condition shown in FIG. 5. Guide body 12 is now free to be moved in either direction, since none of the pawls is in engagement with the rack.

It will be observed that the forces applied by pawls 28 and 32 to rack 14 are not directed along a horizontal line of action, but rather are inclined along a line between the tongue and pivot point of each respective pawl. This rotation of the line of action effects a substantial reduction in the shearing force acting upon the teeth between notches 16. This enables the holddown jack of this invention to withstand substantially greater loads without failure.

This invention may be further developed within the scope of the following claims. Accordingly, the above specification is to be interpreted as illustrative of only a single operative embodiment, rather than in a strictly limited sense.

I now claim:
1. A holddown device comprising:
a notched rack;
a guide body slidably mounted in said rack;
an actuating lever pivotally secured on a first pivot axis to said guide body, said actuating lever having mounted thereon a pawl release cam;
a first pawl pivotally secured on said first pivot axis to said lever and said guide body, said first pawl being provided with a first tongue normally engaging a first notch in said rack while the holddown is under load, and being further provided with a release boss;
a second pawl pivotally secured on a second pivot axis to said lever, said second pawl being provided with a second tongue and normally engaging a second notch in said rack while said holddown is under load;
said first and second pawls normally permitting relative motion between said guide body and said rack in only a single direction;
whereby said guide body may be selectively rendered free to slide in either direction within said rack by a two-stroke cycle of said actuating lever, said first stroke bringing said pawl release cam into a pawl releasing position, and said second stroke of said actuating lever bringing said pawl release cam into abutting engagement with said release boss to thereby cam and hold said first pawl out of engagement with said rack, said first pawl simultaneously camming said second pawl out of rack engaging position during said second stroke.

2. The holddown device of claim 1, wherein said second pivot is intermediate said first pivot axis and the point at which the external force is applied to said actuating lever.

3. A construction as defined in claim 1, and said rack being in the form of an elongated, upwardly opening, channel, having its base arranged substantially horizontally, and with notches formed on the upper, free, edge of at least one of its legs, and with the upper edges of the legs being closer together than the lower edges of the legs; said guide body being approximately in an inverted T-shape cross-section, with the head thereof fitted within the channel beneath and in sliding contact with the inner surfaces of the legs of the channel.

4. The holddown device of claim 1, wherein advancement of said guide body in said single direction is accomplished by a two stroke cycle of said actuating lever, the first stroke releasing said first pawl tongue from said first notch and advancing said guide body until said first pawl tongue engages a third notch of said bracket, said second pawl tongue remaining engaged with said second notch during advancement of said guide body, and the second stroke of said actuating lever advancing said second pawl tongue from said second notch to a fourth notch of said rack, said guide body remaining stationary during the advancement of said second pawl.

References Cited
UNITED STATES PATENTS

| 1,441,617 | 1/1923 | Wilson | 254—72 |
| 1,466,977 | 9/1923 | Tremayne | 254—71 |
| 1,752,495 | 4/1930 | Macchesney et al. | 254—71 |
| 1,974,491 | 9/1934 | Hawley | 254—108 |

JOHN PETO, *Primary Examiner.*

FRANK DOMOTOR, *Assistant Examiner.*